United States Patent [19]

Siddiq

[11] Patent Number: 4,657,816
[45] Date of Patent: Apr. 14, 1987

[54] FERROMAGNETIC RECORDING MATERIALS

[75] Inventor: Mohammed Siddiq, San Jose, Calif.

[73] Assignee: Memorex Corporation, Santa Clara, Calif.

[21] Appl. No.: 369,628

[22] Filed: Apr. 19, 1982

[51] Int. Cl.⁴ .................................................. B05D 5/12
[52] U.S. Cl. .................................. 428/403; 252/62.56;
427/132; 427/215; 427/419.1; 427/434.4;
428/693; 428/694; 428/900
[58] Field of Search .................... 427/132, 215, 419.1,
427/434.4; 428/900, 693, 694, 378, 380, 389,
403; 252/62.56

[56] References Cited

U.S. PATENT DOCUMENTS

| | | | |
|---|---|---|---|
| 3,770,500 | 11/1973 | Imaoka et al. | 117/237 |
| 3,958,068 | 5/1976 | Umeki et al. | 428/403 |
| 3,977,985 | 8/1976 | Umeki et al. | 252/62.55 |
| 4,010,310 | 3/1977 | Kubota et al. | 427/403 |
| 4,064,292 | 12/1977 | Schoenafinger et al. | 427/132 |
| 4,066,564 | 1/1978 | Sasazawa et al. | 252/62.56 |
| 4,066,565 | 1/1978 | Sasazawa et al. | 252/62.56 |
| 4,067,755 | 1/1978 | Umeki et al. | 148/105 |
| 4,069,367 | 1/1978 | Umeki et al. | 427/132 |
| 4,125,474 | 11/1978 | Dezawa et al. | 252/62.62 |
| 4,188,302 | 2/1980 | Becker et al. | 252/62.56 |
| 4,200,680 | 4/1980 | Sasazawa et al. | 428/403 |
| 4,224,175 | 9/1980 | Montino et al. | 252/62.56 |
| 4,226,909 | 10/1980 | Kanten | 428/329 |
| 4,267,207 | 5/1981 | Sasazawa et al. | 427/129 |

Primary Examiner—Norman Morgenstern
Assistant Examiner—Janyce A. Bell
Attorney, Agent, or Firm—John J. McCormack; Nathan Cass; David W. Heid

[57] ABSTRACT

Low performance ferromagnetic oxides are taught to be convertible into high performance ferromagnetic oxides with vastly improved coercivity by suspending ferromagnetic oxide particles in aqueous media, forming a layer of the first metal on the surfaces of the particles, forming a layer of second metal on the surfaces of the first metal and lastly, forming a layer of third metal on the surfaces of the second metal. The first and third metals can be the same in preferably transition metals such as cobalt. The second metal must be different than the first and third metals such as, for example, iron.

37 Claims, 1 Drawing Figure

EFFICIENCY OF MODIFICATION PROCEDURES

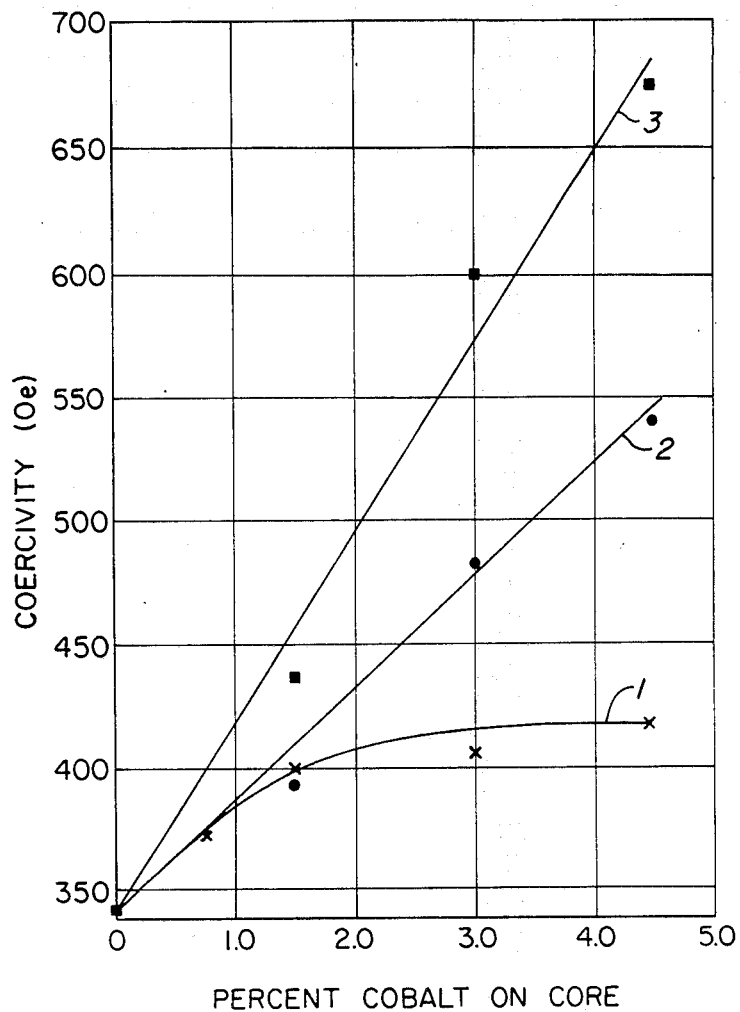

FERROMAGNETIC RECORDING MATERIALS

BACKGROUND OF THE INVENTION

It is known that that ferromagnetic iron oxide useful for high density magnetic recording should possess a high coercive force. There are several techniques for increasing the coercivity of a ferromagnetic oxide powder. These include, for example, adding cobalt to acicular ferromagnetic oxide.

U.S. Pat. No. 4,188,302 teaches the use of an aqueous suspension of $\gamma$-$Fe_2O_3$ containing cobalt and iron ions to form a single mixed coating on a ferromagnetic oxide core. The coercivity of the coated particles can then be increased by heating the ferromagnetic oxide particle for a sustained period.

The properties of coercivity as well as remanent magnetism are important characteristics of magnetic tapes for they directly reflect the recording density which a magnetic tape can achieve. Ever increasing demands to improve the areal density of recorded and retrievable information have put a great challenge on the recording media as well as magnetic particulate manufacturers to design, produce, and use materials which are capable of increasing recording density without sacrificing other performance aspects such as magnetic stability. This burden is particularly acute when one considers that about 80–85% of the tonnage and material costs of magnetic recording media coating is attributable to the magnetic particulates.

As alluded to above, one principal method of particle modification to improve coercivity is adding cobalt to $Fe_3O_4$ or $\gamma$-$Fe_2O_3$ which results in substituting cobalt for iron ions in $Fe_3O_4$ or by filling vacant lattice positions in $\gamma$-$Fe_2O_3$ with cobalt ions.

Prior art modification methods have employed the use of FeOOH, $Fe_3O_4$, $\gamma$-$Fe_3O_4$, and partially reduced $\gamma$-$Fe_2O_3$ to serve as core materials. To generalize, the materials in particulate form are suspended in aqueous solutions of cobalt, iron, or other transition metal ions traditionally as divalent salts and, in some cases, with complexing and reducing agents. A chemical reaction is carried out by adding equal or greater than stoichiometric amounts of a base such as NaOH, KOH or $NH_4OH$ at specified conditions of temperature, pressure, concentration of modifying metal salt solutions and pH for a specific period of time. The core materials so treated are then separated from the aqueous phase, dried, and usually subjected to a heat-treatment which is carried out in oxidizing, reducing, or inert environmental conditions at a specified temperature for a specified period of time. The extent of increase or enhancement of magnetic properties specifically in coercivity and specific saturation and remanent magnetization which is achieved depends primarily on (1) the amount of cobalt, (2) the amount of other metallic ions, if present, (3) conditions of modification of the recited treatment reactions, and (4) the post heat treatment program.

There are, however, certain disadvantages associated with the above-described particle modification methods. For example, there is a certain lack of chemical as well as processing flexibility. Cobalt, an extremely expensive element, is not used efficiently while post heat treatment steps cause magnetic instability and provide for gas-solid reactions which are difficult to control.

From the material user's standpoint, the prior art processes are very complicated and require extensive equipment and manpower to justify an in-house effort to produce and use high-performance materials. These methods lack the flexibility for direct incorporation of modified materials into the coating formulations resulting in an invariable need for drying and post-treatment steps. Lastly, precise control of FeO content and, hence, of saturation and remanent magnetization, which increases low frequency response and sensitivity of the recording media, is very difficult.

It is thus an object of the present invention to produce high-performance ferromagnetic oxides without the difficulties experienced by prior art methods.

It is yet another object of the present invention to convert low-performance ferromagnetic oxides into high-performance ferromagnetic oxides with increased coercivity without the need for post-treatment heating steps.

It is still another object of the present invention to produce high coercivity ferromagnetic iron oxides using lesser amounts of cobalts than utilized in prior inventions or previously practiced methods.

It is yet another object of the present invention to produce a high-performance ferromagnetic oxide particle whereby the divalent iron oxide (FeO) content and hence the saturation magnitization can be precisely controlled.

These and other objects of the present invention will be more fully appreciated when considering the following discussion.

SUMMARY OF THE INVENTION

The present invention deals with the preparation and manufacture of high coercivity recording materials, specifically, high coercivity ferromagnetic oxides by which low coercivity iron oxides are modified by depositing two or more distinct layers of metal compounds, preferrably, compounds of cobalt, iron, mixed compounds of the same, or compounds of other transition metal ions such as manganese, nickel and zinc or mixed compounds thereof to yield high coercivity and high saturation magnetization materials suitable for high density analog and digital magnetic recording members.

The method of the present invention comprises suspending low coercivity ferromagnetic oxide particles in an aqueous medium, forming a layer of the first metal on the surfaces of the particles, forming a layer of the second metal on the surfaces of the first metal, and forming a layer of the third metal on the surfaces of the second metal. The first and third metals can be the same. Ideally, the first, second and third metal layers are formed by providing individual solutions of each metal separately and adding a sufficient quantity of a base to cause metal adsorption reactions to take place on each surface. This multi-layer growth approach is based on the principle of "surface renewal". Ideally, each metal is added in an amount to saturate the surface to which the metal is applied.

As an example of practicing the present invention, a ferromagnetic oxide of low coercivity and magnetic moment composed of $\gamma$-$Fe_2O_3$ or $Fe_3O_4$ or the intermediate or pretreated forms thereof and being of suitable particle size, surface area and overall morphology can be milled and suspended in water with or without any base or dispersing agents. According to prior art techniques, transition metal ions such as cobalt and iron would be added together in a single step in order to modify the ferromagnetic core particle. By contrast, the present invention splits the amounts of transition metal ions into various portions and adds them during different steps according to a predesigned scheme.

If cobalt were to be used as the first transition metal ion, it would be added to the aqueous suspension and then subjected to an adsorption reaction to completely form a layer of cobalt upon the ferromagnetic core materials. Then, to the same suspension, would be added a solution of another transition metal ion such as ferrous ions and a base, such as NaOH to grow an iron containing layer atop the cobalt layer. The iron so formed acts as a new core or surface which is more susceptible to adsorption of a third layer, such as cobalt. A third solution containing, for example, cobalt, is formed and added to the suspension which is again subjected to a base such as NaOH to form a third layer similar to the first. This process can be continued further with other surface renewal reactions.

The above-recited process results in a multi-fold enhancement of the magnetic properties of a ferromagnetic particle from a fixed amount of transition metal ions. Maximizing the use of these materials is extremely important for cobalt, if used as one of the transition metal ions, is extremely expensive particularly when used on a commercial basis. Also, all of the reactions involve only the employment of wet chemistry in a single reaction vessel. After the reactions are complete, the suspension can be filtered, washed and dried to recover the modified oxides which do not require any post heat treatment to achieve high coercivity and magnetic moment.

However, post heat treatment can still be applied to further increase the coercivity of modified oxides prepared according to the present invention.

EXAMPLE I

Single Layer Structure 20.0 g of accicular gamma ferric oxide powder having a surface area of ca..30 m$^2$/g, a coercivity of 340 oetsteds, and a saturation magnetization of 72.3 emu/g was dispersed in 2 liters of DI water. The suspension was bubbled with nitrogen for 30 minutes to purge air from the system and 2.8 g $CoSO_4.7H_2O$ and 7 g $FeSO_4.7H_2O$ dissolved in 200 ml of DI water were added to the reaction vessel. This was followed by the addition of 5.9 g of 50% NaOH over a ten-minute period.

The above suspension was heated with vigorous stirring at 100° C. and maintained at that temperature for an additional 3.5 hours. The suspension was allowed to cool to room temperature, then washed with deionized water until the conductivity was less than 500 μmhos. The oxide was then filtered and dried at 100° C. for 2.5 hours.

Coercivity of the modified oxide was 480 Oe, while the saturation magnetic moment was 78.5 emu/g. Analysis for Co and FeO gave respective values of 2.7% and 4.8%. After subsequent heating at 200° C. for one hour, the coercivity was measured at 610 Oe and the saturation magnetic moment at 75.4 emu/g. This powder was then processed into a polyurethane binder and coated onto a polyethylene terephthalate base in the conventional manner known in the manufacture of magnetic tape. The resulting tape properties are as follows:

TABLE I

| Example I - Properties on Audio Tape | |
|---|---|
| Hc | 668 Oe |
| Ms | 1636 G |
| Squareness | 0.79 |
| Orientation Ratio | 2.12 |
| MOL - 400 Hz | −0.7 dB |
| Signal/Print Ratio 24 hrs/50° C. | 40.5 dB |

EXAMPLE II

Two Layer Structure 100 g of the core material of Example I was dispersed in 2 liters of deionized water and bubbled with nitrogen as in Example I. 50.0 g $FeSO_4.7H_2O$ was dissolved in 200.0 ml deionized water and added to the same suspension as in the previous example. This was followed by the addition of 29.3 g 50% NaOH over a 15-minute period with vigorous stirring.

The suspension was heated to 100° C. and maintained at that temperature for 3.5 hours. The suspension was then allowed to cool to room temperature. A small sample of modified oxide was withdrawn, processed, and analyzed for magnetics, and this sample was denominated Sample A.

To the above suspension was added 14.3 g $CoSO_4.7H_2O$ and 35 g $FeSO_4.7H_2O$ which was followed by the addition of 29.0 g 50% NaOH under vigorous stirring over a 15-minute period. The slurry was then heated and maintained at 100° C. for an additional 3 hours and then cooled. The oxide was washed with deionized water until a conductivity of 400 μmhos was obtained in the slurry. The oxide was then filtered and dried for 3 hours at 100° C. and the sample denominated Sample B.

Coercivity values for Samples A and B were 297 Oe and 441 Oe, respectively. Saturation magnetic moments were measured at 78.5 emu/g and 84.5 emu/g, respectively. Potentiometric analysis for Co and FeO for Sample A gave values of 0.07% and 4.9%. While for Sample B, Co and FeO values were 2.8% and 15.2%, respectively.

EXAMPLE III

Three Layer Structure 100 g of the core oxide of Example I was dispersed, added to the reaction vessel and purged with nitrogen as described in the previous examples. 7.1 g $CoSO_4.7H_2O$ was dissolved in 100 ml deionized water and added to the reaction vessel with stirring. To this was added 4.2 g of 50% NaOH over a 10-minute period. The slurry which formed was then heated to 100° C. and maintained at that temperature for 3 hours and then cooled to room temperature. A 5.0 g sample labeled X, was withdrawn, filtered, washed and dried as in the previous example.

To the remaining cooled slurry, 35.0 g $FeSO_4.7H_2O$ dissolved in 200 ml deionized water, was added. Thereupon, 20.5 g 50% NaOH diluted to 150 ml was added to the reaction vessel over a 15-minute period with vigorous stirring. The slurry which formed was heated to 100° C. maintained at that temperature for 16 hours, and then allowed to cool. A 5.0 g sample, labeled Y, was withdrawn and processed and analysed as described above.

To the remaining cooled slurry, 7.1 g $CoSO_4.7H_2O$ dissolved in 100 ml deionized water with stirring, was added. Then, 4.25 g 50% NaOH which was diluted to 100 ml was added over a 15-minute period with vigorous stirring. The slurry was then heated to 100° C. while stirring and maintained at that temperature for 3 hours and then cooled to room temperature. The oxide, labeled Sample Z, was washed until a conductivity of 500 mhos was obtained, then filtered and dried for 2.5 hours.

A portion of Sample Z was post-heat treated exactly in a manner described in Example I. The oxide obtained was labeled Sample ZZ.

The pertinent magnetic and chemical analysis for Samples X, Y, Z and ZZ are as follows:

| Powder | Sample X | Sample Y | Sample Z | Sample ZZ |
|---|---|---|---|---|
| Hc (Oe) | 405 | 399 | 596 | 779 |
| $\sigma_s$ (EMU/g) | 72.7 | 78.1 | 78.9 | 77.6 |
| Co | 1.5% | 1.4% | 2.9% | 2.9% |
| FeO | 0.2% | 6.0% | 7.8% | 6.1% |

The modified oxide of Example III, Sample Z was processed with a polyurethane binder system and coated onto polyethylene terephthalate base in the conventional manner known in the manufacture of magnetic tape. The magnetic properties of this tape are as follows:

TABLE II

Example III - Properties of Three Layer Non-Post Heat Treated Modified Oxide on Audio Tape

| Hc | 619 Oe |
|---|---|
| Ms | 1936 G |
| Squareness | 0.84 |
| Orientation Ratio | 2.82 |
| MOL - 400 Hz | +3.7 dB |
| Signal/Print Ratio 24 hrs/50° C. | 43.6 dB |

EXAMPLE IV

Five Layer Structure

Exactly the same preparation procedure of Example III was followed until the three-layer oxide slurry was obtained. This slurry was further processed by repeating the procedure for depositing the iron and cobalt layers as recited in the same example. The five-layer non-post-heat treated-modified oxide powder had coercivity and saturation magnetic moment of .674 Oe and 81.7 emu/g, respectively. The chemical analysis of the same powder for Co and FeO gave values of 4.1 and 13.5%, respectively.

A comparison of modified oxides obtained by the methods of Examples I through III is shown in Table III. In each case, the cores were modified with 3% cobalt ion and 7% iron ion. The improvements in the magnetic properties of the 3-layered structure of the present invention are quite evident by viewing Table III.

TABLE III

Modification Experiments Using 3% Cobalt Ion and 7% Iron Ion on Core (No post heat treatment)

| Experiment | Method as in Examples | Hc (Oe) | $\sigma_s$ (EMU/g) |
|---|---|---|---|
| 3% Co++//7% Fe++ (2 layer) | II | 457 | 79.1 |
| 7% Fe++//3% Co++ (2 layer) | II | 449 | 75.7 |
| Expitaxial (Co-precipitation) | I | 480 | 78.5 |
| 1.5% Co++//7% Fe++//1.5% Co++ (3 layers) | III | 600 | 78.5 |

In order to further demonstrate that the method of the present invention produces an improved magnetic particle, the metal ion precipitation as described in Example III was used to obtain various distributions of cobalt and iron ions in respective layers, although a total of 3% cobalt and 7% iron was maintained. The results are shown in Table IV.

TABLE IV

Splitting of Cobalt Ion or Iron Ion Amounts

| Experiment | Hc (Oe) | $\sigma_s$ (EMU/g) |
|---|---|---|
| 1% Co++//7% Fe++//2% Co++ | 556 | 77.6 |
| 2% Co++//7% Fe++//1% Co++ | 543 | 78.0 |
| 1.5% Co++//7% Fe++//1.5% Co++ | 600 | 78.5 |
| 3.5% Fe++//3% Co++//3.5% Fe++ | 501 | 74.7 |

The figure which is attached depicts the efficiency of the modification procedures of the present invention as a graph of coercivity versuses % cobalt on a ferromagnetic core. More specifically, $\gamma\text{-Fe}_2\text{O}_3$ cores were modified according to prior art and inventive methods shown herein. Curve 1 shows the relationship between coercivity and % cobalt when only cobalt is added to the $\gamma\text{-Fe}_2\text{O}_3$ particles. Curve 2 shows a similar relationship when cobalt and iron ions are epitaxially applied to the core as a single layer. By contrast, Curve 3 depicts the relationship between coercivity and % cobalt when a cobalt/iron/cobalt three or more layered structure is produced according to the present invention.

As stated previously, prior art particles can approach the magnetic properties of the multi-layered particles of the present invention only if a post formation heating step is carried out. By contrast, magnetic particles of the present invention can be conveniently produced by employing only wet chemistry methods. This method of particle modification also lends itself to direct utilization of the final slurry in making of magnetic recording members. For example, one needs only remove excess salts from a finished suspension of ferromagnetic particles and then use the same slurry in making the final product either by solvent replacement followed by conventional solvent borne formulation technology or by using the more direct water borne formulation technology without resorting to essential filtration, washing, drying and post heat treatment process steps. Therefore, the method described and claimed herein directly overcomes prior art manufacturing flexibility problems, poor cobalt efficiency usage, magnetic instability and costly post treatment process steps.

I claim:

1. A method of converting low performance ferromagnetic oxides into high performance ferromagnetic oxides adapted for a prescribed magnetic recording media coating comprising:
   a. Suspending low performance ferromagnetic oxide particles in an aqueous medium;
   b. Adding a first magnetic metal moiety and treating to form a layer of a first metal compound on the surfaces of the particles;

c. Adding a second magnetic metal moiety and treating to form a layer of a second metal compound on the surfaces of the first metal; and d. Adding a third magnetic metal moiety and treating to form a layer of a third metal compound on the surfaces of the second metal compound; and e. Preparing the resultant particles for inclusion in said coating.

2. The method of claim 1 wherein the first metal compound and third metal compound are comprised of the same magnetic metal, executing all these forming steps as part of a single sequence in a single vessel and using wet chemistry methods.

3. The method of claim 2 wherein said first metal and third metal are selected from the group consisting of cobalt, iron, manganese, nickel, zinc, and mixtures thereof.

4. The method of claim 3 wherein said first metal and third metal are cobalt and said second metal is iron.

5. The method of claim 3 wherein said first metal and third metal are iron and said second metal is cobalt.

6. The method of claim 1 wherein additional alternating layers of metal compounds are formed on the surfaces of said third metal compound.

7. The method of claim 6 wherein the additional alternating layers of metal compounds are comprised of a metal selected from the group consisting of coablt, iron, manganese, nickel, zinc and mixtures thereof.

8. The method of claim 1 wherein said first, second and third metal compound layers are formed by providing individual solutions of metal salts of each metal compound separately and adding a sufficient quantity of a base to cause metal ion adsorption reactions to take place on each surface to which the metal compounds are applied.

9. The method of claim 8 wherein the metal ions in each solution are added in each instance in an amount to saturate the surfaces to which they are applied.

10. The method of claim 1 wherein said low performance ferromagnetic oxides are selected from the group consisting of $\gamma$-$Fe_2O_3$, $Fe_3O_4$, and intermediate oxides thereof.

11. The method of claim 8 wherein the first and third metal compound layers comprise cobalt ions derived from $CoSO_4.7H_2O$ and other divalent cobalt salts.

12. The method of claim 11 wherein the second metal compound layer comprises iron ions derived from $FeSO_4.7H_2O$ and other divalent ion salts.

13. The method of claim 8 wherein the base comprises NaOH.

14. A high performance ferromagnetic oxide particle comprising a ferromagnetic oxide core, and coatings of three metal compounds thereon wherein the second metal compound coating is dissimilar to the first and third metal compound coatings:

15. The high performance ferromagnetic oxide particle of claim 14 wherein said first and third metal compound coatings are the same.

16. The high performance ferromagnetic oxide particle of claim 15 wherein the first metal and third metal are selected from the group consisting of cobalt, iron, manganese, nickel, zinc and mixtures thereof.

17. The high performance ferromagnetic oxide particle of claim 16 wherein said first metal ion and third metal ion comprise cobalt and said second metal ion comprises iron.

18. The high performance ferromagnetic oxide particle of claim 16 wherein said first metal ion and third metal ion comprise iron and said second metal ion comprise cobalt.

19. The high performance ferromagnetic oxide particle of claim 14 further comprising additional alternating layers of metal compounds formed on the surface of said third metal compound.

20. The high performance ferromagnetic oxide particle of claim 19 wherein the said alternating layers of metal compounds are comprised of metal ions selected from the group consisting of cobalt, iron, manganese, nickel, zinc and mixtures thereof.

21. A high performance ferromagnetic oxide particle comprising a ferromagnetic oxide core, and coatings of two metal compounds thereon, wherein the second metal compound coating is dissimilar to the first metal compound coating.

22. The high performance ferromagnetic oxide particle of claim 21 wherein said first and second metal ions are selected from the group consisting of cobalt, iron, magnanese, nickel, zinc and mixtures thereof.

23. The high performance ferromagnetic oxide particle of claim 22 wherein the coercivity of the particle is further increased by subjecting the particle to heat treatment after the metal compound coatings have been applied to the ferromagnetic oxide core.

24. In a magnetic recording member the improvement comprising the high performance ferromagnetic oxide particles of claims 14 or 21.

25. A method of converting low performance ferromagnetic oxides into high performance ferromagnetic oxides without need for post-heating and without need to resort to separate reactive vessels or to other than wet chemistry methods, this method comprising:

a. Suspending low performance ferromagnetic oxide particles in an aqueous media;

b. Forming a layer of a first metallic constituent on the surfaces of the particles; and forming at least one other pair of layers thereon, each such pair formed by;

c. Forming a layer of a second metal constituent on the surfaces of the first constituents; and d. Forming a layer of a third metal constituent on the surfaces of the second metal constituent; said second constituent being different from the others.

26. The method of claim 25 wherein the first and third metal constituents are formed of the same metal ions.

27. The method of claim 26 wherein the metal constituents of the first and third layers are selected from the group consisting of cobalt, iron, manganese, nickel, zinc, and mixtures thereof.

28. The method of claim 27 wherein the metal of the first and third metal layers is cobalt, while the second metal layer comprises iron.

29. The method of claim 27 wherein the first and third metal layers are comprised of iron and the second metal layer of cobalt.

30. The method of claim 25 wherein additional alternating layers of dissimilar metals are formed on the surfaces of said third metal layer.

31. A high performance ferromagnetic particle comprising a ferromagnetic oxide core, and at least three coatings of metal constituents thereon wherein the metallic composition of the second and all other successive even-number layers is dissimilar from the composition of the first and all other successive odd-numbered layers.

32. The high performance ferromagnetic oxide particle of claim 31 wherein the odd-number layers are comprised of the same metallic composition.

33. The high performance ferromagnetic oxide particle of claim 32 wherein the odd-number layers are formed from identical metal ions selected from the group consisting of cobalt, iron, manganese, nickel, zinc and mixtures thereof.

34. The high performance ferromagnetic oxide particle of claim 33 wherein the odd-number layers comprise cobalt and the even-number layers comprise iron.

35. The high performance ferromagnetic oxide particle of claim 32 wherein the odd-number layers comprise iron and the even-number layers comprise cobalt.

36. The high performance ferromagnetic oxide particle of claim 31 further comprising at least one additional pair of alternating layers of different metallic composition formed on the surface of the third layer.

37. The high performance ferromagnetic oxide particle of claim 36 wherein the metal ions selected to form the different alternating layers are selected from the group consisting of cobalt, iron, manganese, nickel, zinc and mixtures thereof.

* * * * *